Oct. 24, 1933.  S. HALVORSEN  1,932,362
LIMIT LOAD CLUTCH
Filed July 18, 1929
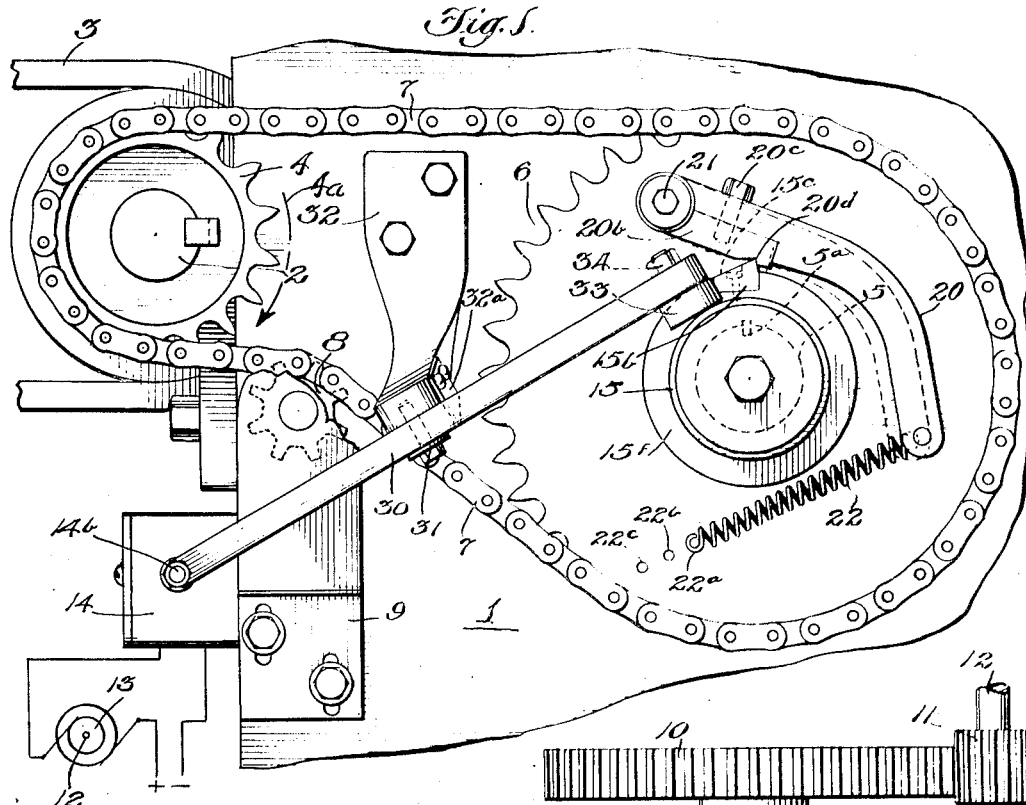
Fig. 1.
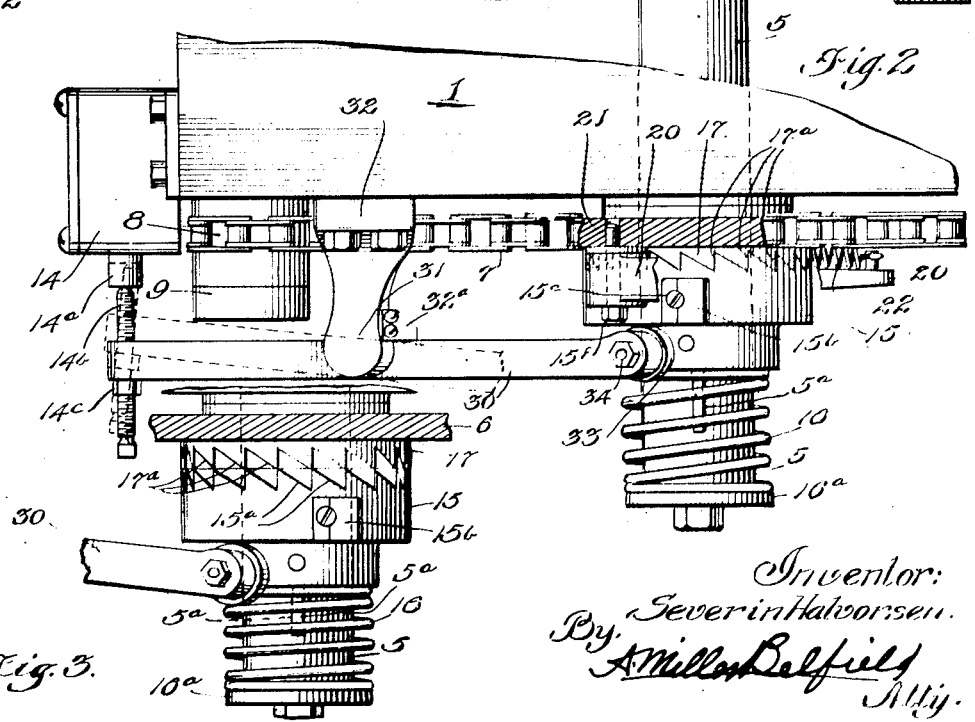
Fig. 2.
Fig. 3.
Inventor:
Severin Halvorsen.
By A. Miller Belfield
Atty.

Patented Oct. 24, 1933

1,932,362

UNITED STATES PATENT OFFICE 1,932,362

LIMIT LOAD CLUTCH

Severin Halvorsen, Chicago, Ill., assignor to The Newspaper Stuffing Machine Company, Seattle, Wash., a corporation of Washington Application July 18, 1929. Serial No. 379,140

8 Claims. (Cl. 192—150)

This invention relates to improvements in limit load clutch, and has for its object the provision of a new and useful device of this character.

Among the objects is to provide means whereby the clutch will transmit power up to a certain amount and then will automatically throw out the mechanical connections between the driver and driven elements.

Another object is to provide means whereby when the clutch is so operated will operate a lever arranged to actuate the source of power to a prime mover of whatever nature is suitable for actuating the driver elements in the device.

Another object is to provide means whereby the clutch device may be variously adjusted to transmit power up to predetermined limits in varying degrees.

Another object of the device is the provision of means for applying this device to any machine where the operating shafts project beyond the boundary of the frame, rendering the device easily appliable and without interfering with other parts of the machine which may exist between the supporting frames thereof.

In the drawing:—

Fig. 1 is a side view of a machine equipped with the device.

Fig. 2 is a plan view of the parts shown in Fig. 1 with portions broken away to disclose certain details of construction.

Fig. 3 is a fragmental view in plan showing certain parts in changed position.

I show a machine frame 1, which may be understood to represent any machine which would utilize moving parts and actuated by rotating shafts such as the shaft 2 which in this case is the head shaft of a conveyor indicated at 3. This shaft will be referred to as the driven shaft and has keyed thereto the sprocket wheel 4. A jack-shaft 5 is mounted and journalled in the frame 1 and has the sprocket wheel 6 loosely mounted thereon. A sprocket chain 7 connects the sprocket wheels 4 and 6 which rotates in a clockwise direction as indicated by the arrow 4$^a$; an idler wheel 8 is mounted in the take-up block 9 for adjusting the tension of the chain 7. The shaft 5 has secured thereto at any convenient point along its length the spur wheel 10, in mesh with the spur pinion 11, which is mounted on the motor shaft 12. The motor (see Fig. 1) is diagrammatically indicated at 13 as electrically connected and controlled by the switch 14. On the protruding end of the shaft 5 is slidably mounted by a feather 5$^a$ on the shaft 5, the sliding throw-out collar 15 which is spring pressed by the spring 16. The sprocket 6 has a hub 17 secured thereto or may be formed integral therewith and has the cam-teeth 17$^a$; the collar 15 has similar cam teeth 15$^a$ the function of which will be hereinafter described. Attached at the extreme end of the shaft 5 is the retaining disc 16$^a$ which provides an abutment for the spring 16 which holds the collar 15 with its teeth 15$^a$ intermeshed with the teeth 17$^a$.

Mounted on the sprocket 6 is a pawl 20 preferably of curved form, one end of which is pivoted to the sprocket 6, at 21. The other end of this pawl is yieldingly held by the spring 22.

On the periphery of the collar 15 is a peripheral tooth 15$^b$ let into the surface of the collar and secured in place by a bolt 15$^c$. This tooth is preferably made of hard material and tempered to withstand wear; likewise a piece 20$^b$ is of hard material and is secured to the member 20 by a bolt 20$^c$ and has a notch 20$^d$ to cooperate with the tooth 15$^b$.

Under normal load the power delivered to the shaft 5 is transmitted to the collar 15 through the spline or feather 5$^a$ and the tooth 15$^b$ drives the lever or pawl 20 which is held by the spring 22 with its notch 20$^d$ in driving engagement with the tooth 15$^b$, the pawl 20 being pivoted at 21 to the sprocket 6 will transmit power and motion through the chain 7 to the shaft 2 of the conveyor 3.

If in case of an overload of the conveyor, which might indicate abnormal conditions in the conveyor or in the machinery beyond the conveyor, the tooth 15$^b$ will, by virtue of the angle of contact between it and the notch 20$^d$, force the pawl upward and away, out of operative engagement. It will be understood that the degree of force transmittable is determined by the angle at which the contiguous surfaces of the members 15$^b$ and 20$^b$ are formed with respect to the pivotal point 21 of the pawl 20.

The spring 22 which holds these parts in operative relation is made of such material and of such proportions as is calculated to be required to properly function and to transmit the required or desired power; to more exactly calibrate the device, provision is made to adjust the initial tension of the spring as by attaching the end 22$^a$ of the spring 22 at various points, as at 22$^b$ or 22$^c$, thus utilizing the same spring to act for transmitting various loads.

It is desirable to bring the machine to a complete stop, for removing the cause of trouble, when conditions prevail that would cause the disengagement of the tooth 15$^b$. This may be accomplished in the case of an installation having an electrical motor by providing a cut-out switch such as is indicated at 14, having an operating button 14ª; a lever 30 fulcrumed at 31 in the bracket 32 is arranged to operate the button 14ª for cutting out the motor current. The means for operating this lever is the member 15 having the teeth 15ª. When the sprocket 6 with its teeth 17ª is arrested in its motion by overloading, will come to rest, the teeth 15ª and 17ª will cooperate to force the collar 15 having the face 15ᶠ outward against the resistance of the spring 16 and will carry the end of the lever 30 with its roller 33 which is mounted at 34 and riding on the face 15ᶠ. The lever thus actuated, will cut out the motor as explained, and no further action of the parts will occur until the current is restored by manually operating the switch 14, as by restoring the button 14ª to its normal protruding position.

To insure the proper relation of the lever 30 and its associated and cooperating parts to act effectively, a stop 32ª is mounted on the bracket 32, so located as to prevent undue contact or dragging of the roller 33 on the face 15ᶠ of the collar 15. An adjustable contacting device for properly operating the button 14ª is arranged at the lever end and is in the form of a screw 14ᵇ, having the lock nut 14ᶜ. Thus the travel of the lever imparted thereto by the teeth 15ª and 17ª will be definitely and accurately transmitted to properly actuate the operating button 14ª.

Many changes in form and in detail may be made without departing from the spirit of this invention.

I claim:

1. In a device of the character indicated, means for mechanically disconnecting the driver from the driven element upon overloading the latter, said means including a notched pawl, a collar having a peripheral tooth therein for cooperating with the notch in said pawl; a spring attached to said pawl, the tooth and notch having contiguous operating surfaces formed at such an angle as to tend to cause the cooperating parts to assume an inoperative position, but held thereagainst by the said spring attached to the said pawl.

2. In a device of the character indicated having a driven element and a prime mover for driving the same, means for disconnecting the driven element from the prime mover, said means including a sliding collar, a lever moved thereby and a cut-out switch for the prime mover, said cut-out switch arranged to be operated by the movement of the said lever, a series of cam-teeth on the said collar to positively move same, thereby transmitting positive movement to the said lever.

3. In a device of the character indicated having a driven element, a jack-shaft mounted in journals for operating the driven element, a prime mover for driving the same, the combination of a switch for cutting out the prime mover, a lever for operating the switch, a sliding collar on the jack-shaft, means for sliding said collar longitudinally of the said shaft, said collar arranged to move the lever, when so slid along the shaft for operating the said switch, the said lever and collar being mounted adjacent the end of the jack-shaft and outside of the journals therefor.

4. In a device of the character indicated having a driven element, a jack-shaft mounted in journals for operating the driven element, a prime mover for driving the same, the combination of a switch for cutting out the prime mover, a lever for operating the switch, a sliding collar on the jack-shaft, means for sliding said collar longitudinally of the said shaft, said collar arranged to move the lever, when so slid along the shaft for operating the said switch, the said lever arranged for such movement, mounted to extend substantially at right angles to the jack-shaft and to the movement of the collar thereon.

5. In a device of the character indicated, means for mechanically disconnecting the driver from the driven element upon overloading the latter, said means including a pawl, said pawl carrying a removable notched member therein, a collar, a tooth removably attached to said collar, said tooth arranged to engage the said notched member carried by said pawl.

6. In a device of the character indicated having a driven element and a prime mover for driving the same, means for disconnecting the driven element from the prime mover, said means including a sliding collar, a lever moved thereby and a cut-out switch for the prime mover, said lever arranged to operate the said cut-out switch, a roller mounted at one end of the said lever for contact with the collar, in its movement, and a stop for the lever to prevent undue dragging of the said roller on the said collar.

7. In a device of the character indicated, comprising a driven element, a prime mover for driving same, mechanical means for disconnecting the driven element from the prime mover, said means including a sliding collar, a switch-operating lever arranged to be moved thereby, a roller secured to one end of said lever, said roller mounted adjacent the said collar, for ultimate contact therewith, and a stop for the said lever arranged to prevent contact of the roller and the collar during the normal operation of the device.

8. In a device of the character indicated having a driven element, a jack-shaft mounted in journals for operating the driven element, a prime mover for driving the same, the combination of a switch for cutting out the prime mover, a lever for operating the switch, a sliding collar on the jack-shaft, means for sliding said collar longitudinally of said shaft including a pawl pivotally connected to said driven element, said collar arranged to move the lever when so slid along the shaft for operating the said switch.

SEVERIN HALVORSEN.